(12) United States Patent
Magnus et al.

(10) Patent No.: US 7,117,891 B2
(45) Date of Patent: Oct. 10, 2006

(54) HYDRAULIC COUPLING COMPRISING A PRESSURE BLEED DEVICE

(75) Inventors: Heyn Halfdan Magnus, Kongsberg (NO); Petter Støvset, Kongserg (NO)

(73) Assignee: FMC Kongsberg Subsea AS, Kongsberg (NO)

(*) Notice: Subject to any disclaimer, the term of this patent is extended or adjusted under 35 U.S.C. 154(b) by 99 days.

(21) Appl. No.: 10/937,020

(22) Filed: Sep. 9, 2004

(65) Prior Publication Data

US 2005/0087245 A1 Apr. 28, 2005

(30) Foreign Application Priority Data

Sep. 9, 2003 (NO) .................................. 20033988

(51) Int. Cl.
*F16L 37/28* (2006.01)

(52) U.S. Cl. ............... 137/614.04; 137/860; 251/149.6

(58) Field of Classification Search .......... 137/614.03, 137/614.04, 860; 251/149.6
See application file for complete search history.

(56) References Cited

U.S. PATENT DOCUMENTS

| | | | | |
|---|---|---|---|---|
| 3,618,690 A | * | 11/1971 | Johnson | 137/514.7 |
| 3,730,221 A | * | 5/1973 | Vik | 137/614 |
| 3,777,771 A | * | 12/1973 | De Visscher | 137/1 |
| 4,703,774 A | * | 11/1987 | Seehausen | 137/614.04 |
| 4,813,454 A | * | 3/1989 | Smith, III | 137/614.04 |
| 4,858,648 A | * | 8/1989 | Smith et al. | 137/614.04 |
| 5,277,225 A | * | 1/1994 | Smith | 137/614.04 |
| 5,360,035 A | * | 11/1994 | Smith | 137/614.04 |
| 5,365,972 A | | 11/1994 | Smith, III | |
| 5,810,048 A | * | 9/1998 | Zeiner-Gundersen | 137/614.04 |
| 6,123,103 A | * | 9/2000 | Smith, III | 137/614.04 |
| 6,474,359 B1 | | 11/2002 | Smith, III | |

FOREIGN PATENT DOCUMENTS

| | | |
|---|---|---|
| GB | 2 209 199 A | 5/1989 |
| GB | 2 370 862 A | 7/2002 |

\* cited by examiner

*Primary Examiner*—John Fox
(74) *Attorney, Agent, or Firm*—Henry C. Query, Jr.

(57) ABSTRACT

The invention is directed to a pressure bleed device for a hydraulic coupling which includes a male component that comprises a body, a flow passage which extends generally axially through the body, a valve seat which is formed proximate one end of the flow passage, and a valve element which is biased into sealing engagement with the valve seat to thereby close the flow passage. The pressure bleed device includes a bleed passage which extends through the body and communicates with the flow passage, and a valve for selectively opening the bleed passage when an internal pressure within the flow passage is greater than an external pressure outside the body. Thus, when the flow passage is closed, excess internal pressure within the flow passage is vented outside the body through the bleed passage.

20 Claims, 1 Drawing Sheet

HYDRAULIC COUPLING COMPRISING A PRESSURE BLEED DEVICE

BACKGROUND OF THE INVENTION

The present invention relates to an underwater hydraulic coupling. More particularly, the invention relates to a hydraulic coupling which includes a pressure bleed device for venting excess pressure from the hydraulic line to which the coupling is connected.

Hydraulic couplings are commonly used to functionally connect separate lengths of hydraulic transmission lines. Such couplings generally include a male component which comprises a cylindrical probe and a female component which comprises a cylindrical receptacle into which the probe is inserted. Each of the male and female components typically also comprises a spring-loaded poppet valve that seals against a corresponding valve seat and a valve actuator in the form of a nose or a stem that extends longitudinally from the poppet valve. Thus, when the male and female components are connected together, the valve actuators will push against each other and force the poppet valves away from their respective valve seats to thereby allow fluid to flow through the coupling. In order to prevent hydraulic fluid from leaking into the environment, one or both of the male and female components may comprise a number of environmental seals for sealing between the probe and the receptacle.

Hydraulic couplings of this kind are often used in conjunction with underwater devices which are employed in the production of oil or gas from subsea wells. In addition, the male and female components of the couplings are usually attached to opposing plates of a manifold so that several couplings may be connected and disconnected simultaneously. In this regard, the plate to which the female components are attached is often rigidly connected to a subsea structure, while the plate to which the male components are attached is detachable so that it may be brought to the surface. Furthermore, in order to prevent an efflux of hydraulic fluid during separation of the male and female components, the couplings are designed such that the poppet valves will close before the environmental seals are disengaged.

When the male and female components are disconnected from each other, hydraulic pressure may become trapped in the lines to which these components are connected. If the hydraulic pressure is trapped subsea, the settings of the valves throughout the hydraulic system may be disrupted, which may result, for example, in failsafe-type valves being prevented from moving to the failsafe position. It is therefore desirable to bleed the hydraulic lines to relieve this trapped pressure. However, bleeding the lines may also allow seawater to enter the hydraulic system, which is undesirable.

In U.S. Pat. No. 5,365,972, an underwater hydraulic coupling is described in which at least one of the male and female components comprises a bleed passage which extends through the poppet valve and the valve actuator. To prevent the ingress of seawater, the component includes a second poppet valve which faces in the opposite direction of the main poppet valve. These two poppet valves are coupled together such that, when the actuator pushes the main poppet valve open, it also forces the second poppet valve to open. After the main poppet valve is closed, if overpressure is present in the hydraulic line, the second poppet valve will open against the force of a spring and thus allow the hydraulic pressure to escape through the bleed passage.

However, this coupling is relatively complicated and comprises several fine-tolerance components which may have an increased risk of failure. Also, the proper operation of this design relies on the balancing of a number of springs, which may result in the failure of the coupling if the springs are not properly tuned. In addition, the bleed passage will allow sea water to enter the coupling even when the main poppet valve is closed. This can lead to corrosion and scaling of the poppet valves, which may further deteriorate the function of the coupling.

SUMMARY OF THE INVENTION

In accordance with the present invention, these and other disadvantages in the prior art are overcome by providing a simple but effective pressure bleed device for a hydraulic coupling. The hydraulic coupling includes a male component that comprises a body, a flow passage which extends generally axially through the body, a valve seat which is formed proximate one end of the flow passage, and a valve element which is biased into sealing engagement with the valve seat to thereby close the flow passage. The pressure bleed device includes a bleed passage which extends through the body and communicates with the flow passage, and a valve for selectively opening the bleed passage when an internal pressure within the flow passage is greater than an external pressure outside the body. Thus, when the flow passage is closed, excess internal pressure within the flow passage is vented outside the body through the bleed passage.

In accordance with one embodiment of the invention, the valve maintains the bleed passage closed when the internal pressure is less than the external pressure. In addition, the valve may comprise a resilient seal which is supported on the body over the bleed passage. More specifically, the valve may comprise an O-ring which is supported on the body over the bleed passage.

Thus, the present invention provides a hydraulic coupling which has only a small number of moving parts and is therefore relatively simple and inexpensive to manufacture. Moreover, the simplicity and durability of the O-ring ensures that the pressure bleed device will operate reliably and trouble-free for its entire intended duration.

These and other objects and advantages of the present invention will be made apparent from the following detailed description, with reference to the accompanying drawings.

DETAILED DESCRIPTION OF THE PREFERRED EMBODIMENTS

Figure 1:
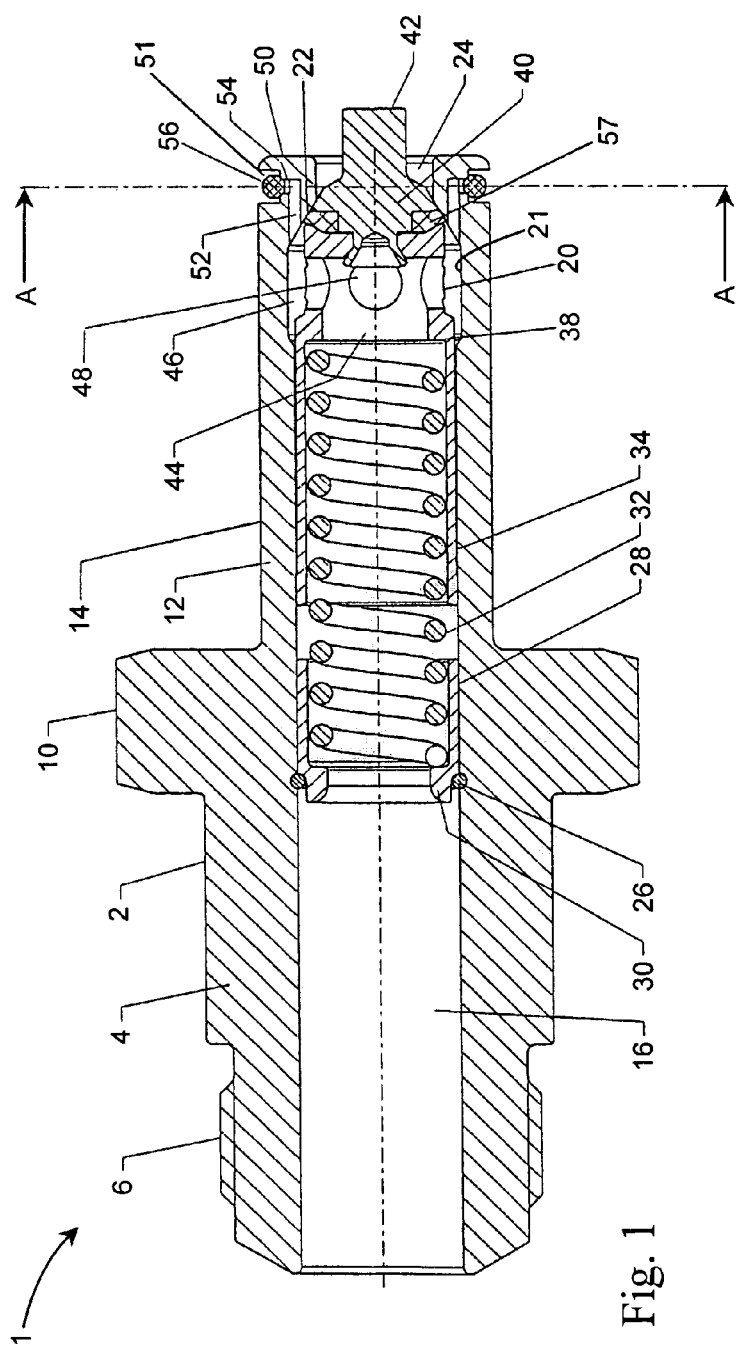
FIG. 1 is a longitudinal cross sectional view of a hydraulic coupler comprising the pressure bleed device of the present invention.
Figure 2:
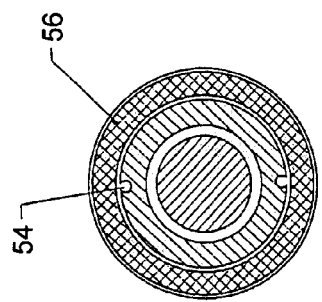
FIG. 2 is a cross sectional view taken along line A—A of FIG. 1.

Referring to FIGS. 1 and 2, the hydraulic coupling of the present invention comprises a male component 1 which is releasably coupled to a corresponding female component (not shown) in a manner understood by persons skilled in the art. The male component 1 comprises a generally tubular body 2 which includes a rear end portion 4. The rear end portion 4 may comprise a set of external threads 6 via which the male component 1 may be connected to a manifold (not shown). The body 2 also includes a suitably shaped gripping portion 10 which may be engaged by, for example, a spanner tool (not shown) to facilitate screwing the male component 1 into the manifold.

The body 2 further includes a probe section 12 which comprises a generally cylindrical outer surface 14 that is adapted to be received in a corresponding receptacle in the female component. A flow passage 16 extends axially through the body 2 and traverses a conical valve seat 22 which is formed in a front end portion 50 of the probe section 12. The flow passage 16 includes a front portion 24 which extends axially from the valve seat 22 to the exterior of the body 2 and an enlarged diameter portion 21 which is formed inwardly of the valve seat 22.

The male component 1 also comprises a spring ring 26 which is disposed in a corresponding groove in the flow passage 16, a first spring retaining sleeve 28 which is positioned in the flow passage against the spring ring, and a second spring retaining sleeve 34 which is positioned in the flow passage between the first spring retaining sleeve and the valve seat 22. The first spring retaining sleeve 28 comprises a radially inwardly projecting rear support shoulder 30, the second spring retaining sleeve 34 comprises a radially inwardly projecting front support shoulder 38, and the male component 1 further includes a preferably helical spring 32 which is positioned in the first and second spring retaining sleeves between the front and rear support shoulders.

A valve element 40, such as a conventional poppet valve, is attached to or formed integrally with an extension portion 20 that in turn is attached to or formed integrally with the second spring retaining sleeve 34. The valve element 40 comprises a conical outer surface portion which is substantially complementary to the valve seat 22 and an actuating portion 42 which projects axially through the front portion 24 of the flow passage 16. The extension portion 20 includes a perforated portion 44 which comprises an outer diameter that is smaller than the outer diameter of the second spring retaining sleeve 34. The perforated portion 44 also includes a number of holes 48 which extend radially through the wall of the extension portion 20 and communicate with an annular space 46 that is formed between the perforated portion 44 and the enlarged diameter portion 21 of the flow passage 16.

The spring 32 is designed to exert a continuous axial force against the second spring retaining sleeve 34 to thereby bias the valve element 40 into engagement with the valve seat 22. The valve element 40 may include a seal element 57, which may be made of, for example, PEEK, that sealingly engages the valve seat 22. When the actuating portion 42 is subject to a force which is greater than the force from the helical spring 32 and the force from any fluid pressure in the flow passage 16, the second spring retaining sleeve 34 will move towards the first spring retaining sleeve 28 and thereby move the valve element 40 away from the valve seat 22. In this position, fluid communication is established between the front portion 24 of the fluid passage and the hydraulic line to which the male component is connected via the first spring retaining sleeve 28, the second spring retaining sleeve 34, the holes 48, the annular space 46 and the resulting void between the valve element 40 and the valve seat 22.

In accordance with the present invention, the male component 1 also comprises a circumferential groove 51 which is milled into the outer surface 14 of the body 2 near the front end portion 50, a number of holes 54 which extend generally radially from the circumferential groove into the body, and a number of longitudinal bores 52 which each extend between a corresponding hole and the enlarged diameter portion 21 of the flow passage 16. The longitudinal bores 52 and the holes 54 thus form a bleed passage which extends from the flow passage 16 to the exterior of the body 2. Although only two associated bores and holes 52, 54 are shown in the Figures, the male component 1 may comprise any number of such bores and holes as may be required or desired. Also, the male component 1 further comprises a bleed valve, such as an O-ring 56, which is positioned in the circumferential groove 51 and functions to selectively open the bleed passage in response to a pressure differential between the flow passage 16 and the external environment, as will be explained below.

The hydraulic coupling of the present invention also comprises a complementary female component which includes a receptacle that is adapted to receive the probe section 12 of the male component 1 when the male and female components are coupled together. In this position, the actuating portion 42 of the male component 1 will engage a corresponding actuating portion of the female component and consequently move the valve element 40 away from the valve seat 22 in the manner described above. As concerns the present invention, the female component is otherwise similar to the male component 1. The actual design and construction of the female component are well known in the art and therefore need not be further described herein.

When the male and female components are disconnected, the spring 32 will force the valve element 40 into its closed position against the valve seat 22, thus preventing the escape of hydraulic fluid from the male component 1. In this position, a pressure differential may exist between the hydraulic fluid in the flow passage 16 and the external environment. If the internal pressure is greater than the external pressure by a sufficient amount, the hydraulic fluid will be vented through bores 52 and the holes 54 in the body 2. In this regard, the pressure of the hydraulic fluid in the holes 54 will displace the O-ring 56, which is elastic and resilient, outwardly to allow the hydraulic fluid to escape into the environment. Conversely, if the external pressure is larger than the internal pressure, the O-ring 56 will be forced tighter into the circumferential groove 51 and thus prevent the ingress of seawater through the holes 54.

It should be recognized that, while the present invention has been described in relation to the preferred embodiments thereof, those skilled in the art may develop a wide variation of structural and operational details without departing from the principles of the invention. Therefore, the appended claims are to be construed to cover all equivalents falling within the true scope and spirit of the invention.

What is claimed is:

1. In combination with a hydraulic coupling which includes a male component that comprises a body, a flow passage which extends generally axially through the body and includes a first end that is adapted to be connected to a hydraulic line, a valve seat which is formed proximate a second end of the flow passages, and a valve element which is biased into sealing engagement with the valve seat to thereby close the flow passage, the improvement comprising a pressure bleed device which includes:
   a bleed passage which extends through the body and communicates with the flow passage; and
   valve means for selectively opening the bleed passage when an internal pressure within the flow passage is greater than an external pressure outside the body;
   wherein when the flow passage is closed, excess internal pressure within the hydraulic line is vented outside the body through the bleed passage.

2. The combination of claim 1, wherein the valve means maintains the bleed passage closed when the internal pressure is less than the external pressure.

3. The combination of claim 2, wherein the valve means comprises a resilient seal which is supported on the body over the bleed passage.

4. The combination of claim 2, wherein the valve means comprises an O-ring which is supported on the body over the bleed passage.

5. The combination of claim 1, wherein the male component includes a probe section which comprises a generally cylindrical outer surface and the bleed passage comprises:
 at least one hole which extends generally radially through the probe section; and
 at least one bore which extends generally longitudinally between a corresponding hole and the flow passage.

6. The combination of claim 5, further comprising:
 a circumferential groove which is formed in the outer surface of the probe section;
 wherein the at least one hole communicates with the groove.

7. The combination of claim 6, wherein the valve means maintains the bleed passage closed when the internal pressure is less than the external pressure.

8. The combination of claim 7, wherein the valve means is positioned in the groove.

9. The combination of claim 8, wherein the valve means comprises a resilient seal.

10. The combination of claim 8, wherein the valve means comprises an O-ring.

11. A hydraulic coupling which comprises:
 a male component which includes a body that comprises a generally cylindrical probe section;
 a flow passage which extends through the body and the probe section and includes a first end that is adapted to be connected to a hydraulic line;
 a valve seat which is formed proximate a second end of the flow passage;
 a valve element which is biased into sealing engagement with the valve seat to thereby close the flow passage;
 a bleed passage which extends through the probe section and communicates with the flow passage; and
 valve means for selectively opening the bleed passage when an internal pressure within the flow passage is greater than an external pressure outside the body;
 wherein when the flow passage is closed, excess internal pressure within the hydraulic line is vented outside the body through the bleed passage.

12. The hydraulic coupling of claim 11, wherein the valve means maintains the bleed passage closed when the internal pressure is less than the external pressure.

13. The hydraulic coupling of claim 12, wherein the valve means comprises a resilient seal which is supported on the probe section over the bleed passage.

14. The hydraulic coupling of claim 12, wherein the valve means comprises an O-ring which is supported on the probe section over the bleed passage.

15. The hydraulic coupling of claim 11, wherein bleed passage comprises at least one bore which extends generally longitudinally through the probe section and communicates with the flow passage.

16. The hydraulic coupling of claim 15, wherein the bleed passage further comprises at least one hole which extends generally radially through the probe section and communicates with a corresponding bore.

17. The hydraulic coupling of claim 16, further comprising:
 a circumferential groove which is formed in an outer surface of the probe section;
 wherein the at least one hole communicates with the groove.

18. The hydraulic coupling of claim 17, wherein the valve means is positioned in the groove.

19. The hydraulic coupling of claim 18, wherein the valve means comprises a resilient seal.

20. The hydraulic coupling of claim 18, wherein the valve means comprises an O-ring.

* * * * *